United States Patent
Mito

[15] 3,657,988
[45] *Apr. 25, 1972

[54] ADAPTERS FOR AUTOMATIC LENS SYSTEM USABLE WITH DIFFERENT REFLEX CAMERAS

[72] Inventor: Hiroshi Mito, Tokyo, Japan
[73] Assignee: Kabushiki Kaisha Tamron, Omiya-shi, Japan
[ * ] Notice: The portion of the term of this patent subsequent to Mar. 17, 1987, has been disclaimed.
[22] Filed: Apr. 16, 1969
[21] Appl. No.: 855,788

Related U.S. Application Data

[62] Division of Ser. No. 626,526, Mar. 28, 1967, Pat. No. 3,500,735.

[30] Foreign Application Priority Data

Apr. 9, 1966 Japan..................................41/024817

[52] U.S. Cl................................95/64 R, 95/44 R, 350/257
[51] Int. Cl.....................................................G03b 9/02
[58] Field of Search...................95/44 R, 42, 11, 64 R, 64 B; 350/252, 257

[56] References Cited

UNITED STATES PATENTS 2,929,308    3/1960    Swarofsky.................................95/64

Primary Examiner—Samuel S. Matthews
Assistant Examiner—Richard L. Moses
Attorney—Blum, Moscovitz, Friedman & Kaplan

[57] ABSTRACT

An objective and adapter assembly for use with single lens reflex cameras according to which an objective of one construction, which includes the diaphragm, can be used with any type of a single lens reflex camera by having a suitable one of a plurality of adapters of the invention connected to the objective and to a camera for which the adapter is designed. Different reflex cameras will have different types of diaphragm-actuating elements and the several adapters are respectively designed for the different types of diaphragm-actuating elements so that by using a suitable adapter which is designed for a given camera the same objective can be used with all types of cameras.

6 Claims, 16 Drawing Figures

FIG.9
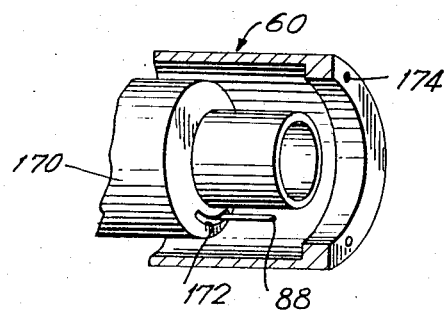
FIG.10
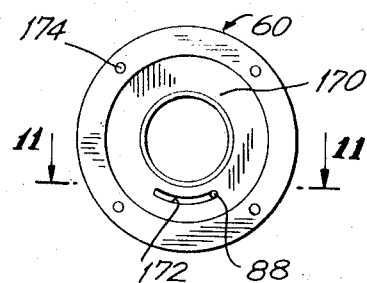
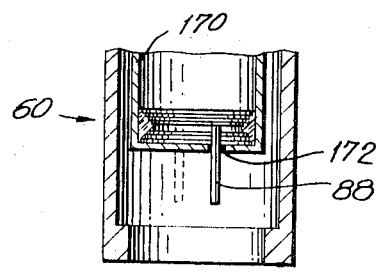
FIG.11

ADAPTERS FOR AUTOMATIC LENS SYSTEM USUABLE WITH DIFFERENT REFLEX CAMERAS

This is a division of application Ser. No. 626,526, filed March 28, 1967 now U.S. Pat. No. 3,500,735, issued Mar. 17, 1970.

BACKGROUND O THE INVENTION

It is customary to provide single lens reflex cameras with interchangeable objectives, these cameras conventionally carrying a focal plane shutter in the camera housing while the diaphragm of the camera is incorporated into the objective thereof. Different types of single lens reflex cameras include different types f diaphragm-actuating elements which are situated in the housings of the cameras. During viewing of the object which is to be photographed the diaphragm is wide open to provide the best possible view of the object during focusing, and when the exposure is to be made it is necessary first to stop the diaphragm down to an aperture which is proper for the particular lighting conditions and then to trip the shutter. With certain types of cameras of this general construction the diaphragm must be manually stopped down by the operator prior to tripping of the shutter to make the exposure. However, there are now many well known camera in which the operator sets into the camera the proper value for the aperture and the diaphragm nevertheless remains wide open for focusing purpose unit the camera is actuated to make an exposure. With is latter type of camera the diaphragm is automatically stopped down to the preselected value just prior to opening of the shutter so that the operator need not be concerned with manual stopping down of the diaphragm before the exposure is made.

The present invention relates to this latter category of cameras in which the diaphragm is automatically actuated to provide the preselected aperture whenever an exposure is made. It is well known that with cameras of this type different cameras have different types of diaphragm-actuating elements. In some cameras these elements shift horizontally beneath the optical axis while in others the diaphragm-actuating element moves, for example, vertically and is situated beside the optical axis, while in still further cameras the diaphragm-actuating element moves parallel to the optical axis and is situated beneath the optical axis, for example, As a result of these wide variations in the constructions of different cameras it is necessary for manufacturers to provide special objectives for different cameras. When it is remembered that these cameras are particularly designed for use with interchangeable objectives of different focal lengths, then the tremendous inconvenience which results from this situation becomes apparent. It becomes necessary for manufacturers to provide complete sets of objectives of various focal lengths all of which are especially constructed so that they can be used interchangeably with only one type of camera. Therefore, the manufacturer of the objectives must make sets of objectives of one construction for one type of camera and completely different sets of objectives of another construction for another type of camera, and of course as a result of the wide variety of objectives which must be manufactured the cost thereof is greatly increased.

SUMMARY OF THE INVENTION

Generally speaking, in accordance with the invention, only one objective construction of a given focal length need be provided for the many different types of cameras. The objective means of the invention includes the diaphragm of the camera, and a plurality of different adapter means are provided each of which is capable of being operatively connected to the same objective means. These plurality of adapter means are respectively operatively connectable to cameras of different types for respectively coacting with the diaphragm-actuating elements thereof, so that with the construction of the invention by providing an adapter which is designed for a given camera it is possible to use with the latter an objective means which can also be used with any other type of camera simply by changing the adapter.

Accordingly, it is an object of this invention to provide for single lens reflex cameras a single objective means, which includes the diaphragm, and a plurality of adapter means which are respectively operatively connectable with different types of cameras and each of which is operatively connectable to the objective means, so that in this way one objective means can be used with all of the different types of cameras.

Another object of the invention is to provide a relatively inexpensive group of adapter means any one of which is capable of cooperating with the same objective means for actuating the diaphragm thereof, so that all of the objective means for all of the different types of cameras can have but a single type of construction while by the choice of a suitable adapter means it becomes possible to use this one type of objective means with any type of camera.

It is furthermore an object of the present invention to provide an adapter means which is of a simple construction which will operate reliably to transmit to the diaphragm of the objective means the movement of the diaphragm-actuating element of the camera.

Another object of the present invention is to provide an adapter means which can be very easily connected on the one hand to the objective means, and on the other hand to the camera.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 9 is a fragmentary schematic sectional elevation of the objective of the invention at the rear portion thereof;

FIG. 10 is a rear end view of the structure of FIG. 9 as seen when viewed from the right of FIG. 9;

FIG. 11 is a schematic sectional plan view of the structure of FIGS. 9 and 10, taken along line 11 — 11 of FIG. 10 in the direction of the arrows;

DESCRIPTION OF PREFERRED EMBODIMENTS

Figure 1:
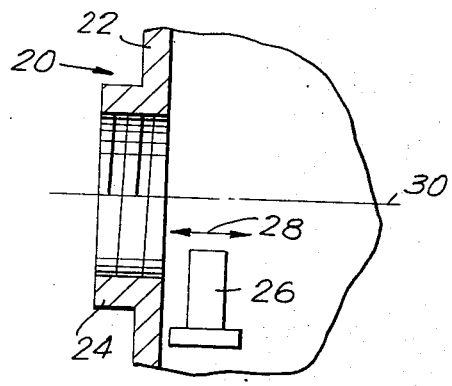
FIG. 1 is a fragmentary schematic sectional side elevation showing one type of camera and diaphragm-actuating element.

Referring now to FIG. 1, there is schematically and fragmentarily illustrated therein a camera housing 20 having a front wall 22 provided with an internally threaded extension 24 which normally would receive a special objective assembly designed for the particular camera shown in FIG. 1. With this particular type of camera, there is a diaphragm-actuating element 26 which moves back and forth horizontally, as shown by the double-headed arrow 28, this element moving parallel to the optical axis 30 and being situated therebeneath. In a well known manner whenever the operator actuates the shutter of the camera, before the shutter actually opens to make the exposure, the diaphragm-actuating element 26 is advanced forwardly, to the left as viewed in FIG. 1, and then after the exposure is made and during focusing the element 26 is retracted to a rear position.

Figure 2:
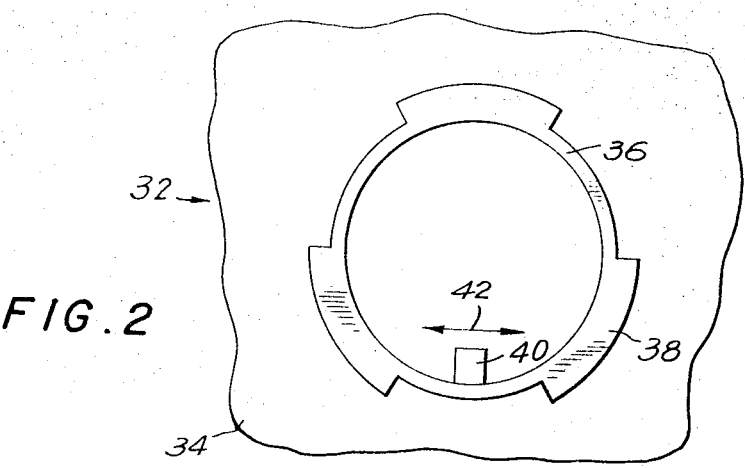
FIG. 2 is a fragmentary schematic front elevation of a camera housing of another type with another type of diaphragm-actuating element.

With the type of camera shown in FIG. 2, the camera housing 32 has a front wall 34 provided with a tubular projection 36 having a bayonet type of connecting structure 38 for connecting to this camera an objective which is particularly designed therefor. With this type of camera there is in the housing a diaphragm-actuating element 40 which moves horizontally, to the left and right as indicated by the double-headed arrow 42 of FIG. 2. For example, with this type of camera whenever the operator actuates the shutter, before the actual opening of the shutter the element 40 is advanced to left in FIG. 2, so as to stop the diaphragm of the objective down to the preselected aperture, and then after the exposure is made the element 40 is retracted the right, as viewed in FIG. 2, so that the diaphragm will remain wide open for focusing purposes.

Figure 3:
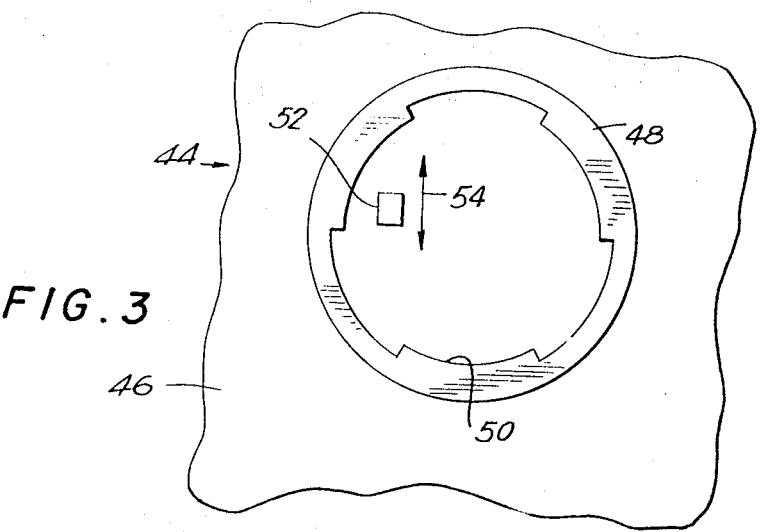
FIG. 3 is a fragmentary schematic front elevation showing a third type of camera housing and diaphragm-actuating element.

With a camera of the type shown in FIG. 3 the camera housing 44 has a front wall 46 provided with a tubular projection 48 also having a bayonet type of connecting structure 50 to coact with an objective assembly particularly designed for this type of camera. In this type of camera there is a diaphragm-actuating element 52 which moves vertically, as shown by the double-headed arrow 54, this element 52 being situated beside and moving perpendicularly with respect to optical axis, while the element 40 of FIG. 2 is situated beneath and also moves perpendicularly with respect to the optical axis. The element 52 of FIG. 3 will be displaced downwardly by the automatic structure of the camera whenever the latter is actuated to make an exposure, this action taking place just prior to opening of the shutter, and after the exposure is made the element 52 is retracted to its upper position in a well known manner, so that the diaphragm will be wide open for focusing purposes.

It is thus apparent from FIGS. 1 – 3 that different types of cameras have different types of diaphragm-actuating elements. These elements may move parallel to the optical axis, as shown in FIG. 1, or perpendicularly thereto as shown in FIGS. 2 and 3, and these elements may move horizontally or vertically as respectively illustrated in FIGS. 2 and 3.

Figure 4:
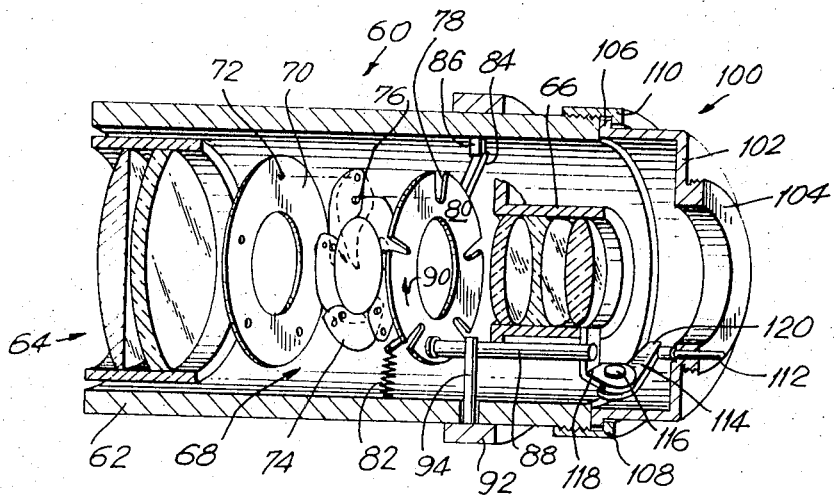
FIG. 4 is a schematic longitudinal sectional elevation, taken in a plane which includes the optical axis, and showing an objective of the invention with one of the adapters of the invention.

Referring now to FIG. 4, the objective means 60 of the invention is illustrated therein. This objective means includes a tubular housing 62 carrying a front lens assembly 64 and a rear lens assembly 66, and between these assemblies is situated the diaphragm means 68. This diaphragm means includes, as schematically shown in FIG. 4, a stationary ring 70 carrying in suitable apertures 72 stationary pivot pins for the diaphragm blades 74 which themselves fixedly carry pins 76, respectively, which are received in slots 78 of a rotary ring 80.

A spring 82 is operatively connected with the ring 80 so as to maintain a stop projection 84, which is fixed thereto in engagement with a stationary stop member 86, and in this position where the stop member 84 of the ring 80 engages the stop 86, which is fixedly carried by the objective housing 62 in the interior thereof, the diaphragm is in its fully opened position enabling the object which is to be photographed to be clearly seen in the viewfinder. The ring 80 fixedly carries a pin 88 which extends parallel to the optical axis and which can be turned together with the ring in the direction of the arrow 90 for reducing the size of the aperture. This latter turning of course takes place in opposition to the spring 82 and during this turning of the ring 80 in the direction of the arrow 90 the slots 78 will respectively coact with the pins 76 to swing the blades 74 inwardly toward the optical axis, thus reducing the size of the diaphragm aperture. The housing 62 is surrounded by a manually turnable ring 92 which can be turned to a selected position by the operator in accordance with the particular size of the aperture which is required, and this ring 92 carries a stop pin 94 situated in the path of turning movement of the pin 88. A suitable scale will be provided to coact with the ring 92 so that the operator, after consulting a light meter, for example, will set the ring 92 at the position indicated for a suitable diaphragm setting, and this will of course determine the position of the pin 94. Suitable detent structure of the like, well known in the art, may be provided for releasably retaining the ring 92 in the position to which it is turned by the operator. This positioning of the ring 92 will have no influence on the ring 80, so that the diaphragm remains in its fully opened position for viewing purposes. When the exposure is to be made, however, just before the shutter opens the pin 88 is swung in the direction of the arrow 90 into engagement with the stop pin 94, so that in this way the diaphragm will be automatically stopped down to the preselected value just prior to opening of the shutter.

The above-described objective means 60 is used, in accordance with the invention, with all cameras irrespective of the different constructions thereof, as exemplified by FIGS. 1–3. It is only required in accordance with the invention to provide different adapters for the different cameras, and FIG. 4 shows the objective means 60 operatively connected with one possible adapter means of the invention, this particular adapter means 100 being operatively connectable to the camera structure of FIG. 1.

Thus, the adapter means 100 includes a stepped cylindrical support member 102 having at its rear a tubular externally threaded portion 104 adapted to be threaded into the tubular portion 24 of the camera housing 20 of FIG. 1. At its front end the cylindrical support 102 has an outwardly directed flange 106 situated next to the rear end surface of the objective housing 62, and this housing is externally threaded at its rear end portion to carry an internally threaded ring 108 provided at its rear end with an inwardly directed flange 110 overlapping the flange 106, so that by way of the ring 108 the adapter means 100 is operatively connected with the objective means 60.

The tubular portion 104 of the adapter means 100 is formed with a bore which extends parallel to the optical axis and which receives and slidably supports a pin 112 which extends parallel to the optical axis. When the parts are assembled, the pin 112 is situated in alignment with the diaphragm-actuating element 26, with the rear end of the pin 112 engaging this element 26 so that movement of the element 26 will be transmitted to the pin 112 which moves back and forth with the element 26.

The diaphragm means 100 includes, in addition to the pin 112, a lever 114 supported for turning movement by a pin 116 which is carried by the cylindrical support 102. This lever 114 has a front arm 118 provided with an upwardly directed free end portion engaging the pin 88 which is held against the arm 118 by the spring 82. This lever 114 has a second arm 120 engaged by the front end of the pin 112. Thus, whenever the diaphragm-actuating element 26 of FIG. 1 is advanced forwardly, just prior to opening of the shutter, the pin 112 will also be advanced forwardly resulting in turning of the lever 114 in the direction of the arrow 125, thus turning the pin 88 and the ring 80 in the direction of the arrow 90, and reducing the size of the aperture until the pin 88 engages the stop pin 94, so that in this way the preselected aperture will be provided.

Inasmuch as the element 26 will move through a given increment at each actuation of the shutter, the arms 118 and 120 are separate from each other but will move together as the result of the action of a spring 122 which is coiled about the pivot pin 116 for the lever and which has its ends respectively engaging the lever arms 120 and 118 so as to urge the arm 118 into engagement with a stationary pin 124 fixedly carried by the arm 120. The spring 122 is stronger than the spring 82 but is not strong enough to displace the stop pin 94 from the position in which it has been placed by the operator, so that as a result when the pin 112 is advanced forwardly by the diaphragm-actuating element 26, the lever arm 118 will move the pin 88 into engagement with the stop pin 94, whereupon, during continued forward movement of the pin 112 the spring 122 will yield permitting turning of the arm 120 with respect to the arm 118 which remains at this time stationary with the pin 88 and the ring 80, thus providing the preselected aperture.

Figure 6:
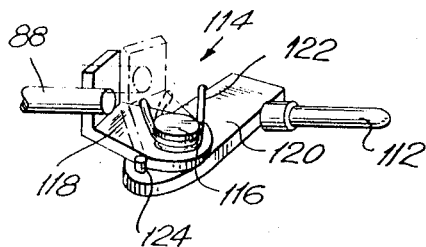
FIG. 6 shows the parts of FIG. 5 in a position different from that of FIG. 5.

FIG. 6 shows in solid lines the positions of the lever arms 118 and 120 before yielding of the spring 122 and in dotted lines the position of the parts after yielding thereof.

Thus, with this construction whenever the objective means 60 is to be used with a camera of the type shown in FIG. 1, it is only necessary to select the adapter means 100 for use with the camera of FIG. 1.

Figure 5:
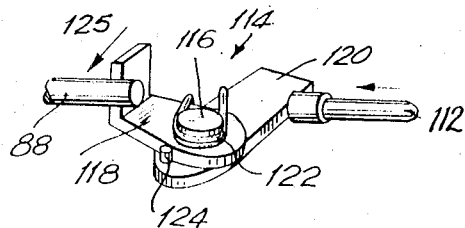
FIG. 5 is a fragmentary perspective view, at an enlarged scale as compared to FIG. 4, showing the structure for transmitting motion from the diaphragm-actuating element of the camera to the diaphragm of the objective.
Figure 7:
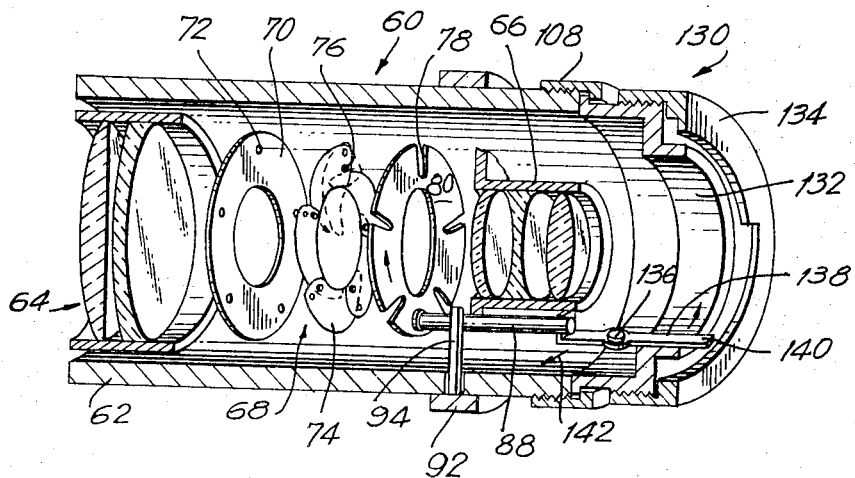
FIG. 7 is a schematic longitudinal sectional elevation of the objective means of the invention operatively connected with a different adapter means thereof.

FIG. 7 shows an objective means 60 identical with that of FIG. 4, so that all of the details thereof are not repeated in FIG. 7. However, this embodiment includes an adapter means 130 which is different from that of FIGS. 4–6 and which is designed for use with a camera of the type shown in FIG. 2. Thus, this adapter means 130 includes a cylindrical support member 132 which is stepped in the manner indicated in FIG. 7 and which has an outer threaded portion carrying a bayonet ring 134 which is adapted to cooperate with the bayonet connection 38 of the tubular projection 36 at the front wall 34 of the camera housing 32 of FIG. 2. Thus, by way of the bayonet connection 134 it is possible to connect the adapter 130 to the camera of FIG. 2. The stepped cylindrical support 132 has at its front end an outwardly directed flange which coacts with a ring 108 identical with that of FIG. 4, so that in this way the adapter means 130 is connected to the objective means 60 in precisely the same way as described above in connection with FIG. 4.

With this embodiment the cylindrical support 132 of the adapter means 130 fixedly carries a pivot pin 136 whose axis is perpendicular the optical axis, and this pivot pin 136 supports a lever 138 for turning movement between the ends of the latter. The forwardly extending arm of the lever 138 coacts with the pin 88 in the same manner as was described above in connection with the lever 114 of FIG. 4. The lever 138 has a rearwardly directed arm 140 which extends into the path of movement of the diaphragm-actuating element 40. When the adapter means 130 is mounted on the camera of FIG. 2, the lever 140 is situated to the left of the element 40, as viewed in FIG. 2, so that when, just before opening of the shutter, this element 40 shifts to the left, as viewed in FIG. 2 and described above, the lever 138 will be turned in the direction of the arrow 142 shown in FIG. 7. Thus, with the camera of FIG. 2 just before opening of the shutter the element 40 is automatically advanced from its retracted right-hand position, as viewed in FIG. 2, to the left as viewed in FIG. 2, thus swinging the lever 138 in the direction of the arrow 142 and causing the pin 88 to be turned into engagement with the stop pin 94 thus providing the preselected aperture. At the pivot pin 136 the arms of the lever 138 may be connected to each other in the same way as the arms of the lever 114 through the same spring means, so that with this construction it is possible for the lever 138 to yield after the pin 88 engages the stop pin 94.

Therefore, when the objective means 60 is to be used with a camera of the type shown in FIG. 2, it is only necessary to provide the adapter means 130 which enables the camera of FIG. 2 to be used with the very same objective means as the camera of FIG. 1.

Figure 8:
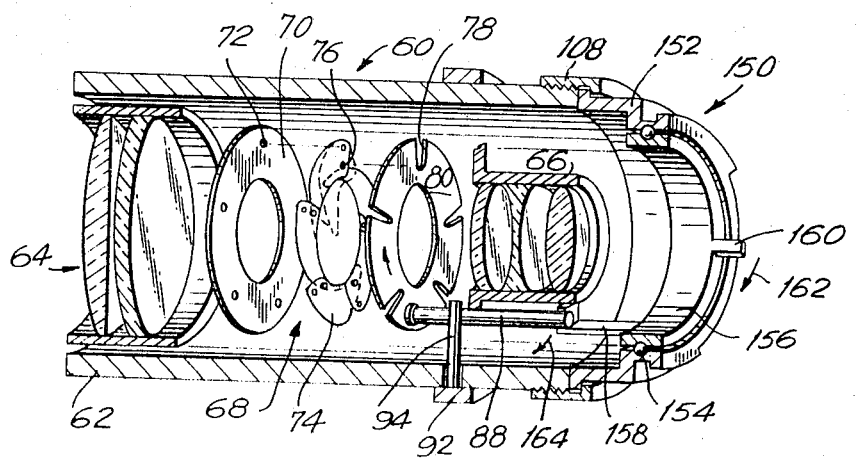
FIG. 8 is a longitudinal sectional elevation of the objective means of the invention with a third possible construction of an adapter means of the invention.

Referring now to FIG. 8, it will be seen that the structure thereof includes the very same objective means 60 as is included in FIGS. 4 and 7. In this case also some of the details shown in FIG. 4 are omitted from FIG. 8 since the objective means of FIG. 8 is identical with that of FIG. 4 and therefore is to be understood as including all of the details described above in connection with and shown in FIG. 4.

The objective means 60 of FIG. 8 is shown connected with a third embodiment of an adapter means according to the invention, this adapter means 150 of FIG. 8 being designed to connect the objective means 60 to a camera of the type shown in FIG. 3 where the diaphragm-actuating element moves vertically. The adapter means 150 includes a stepped cylindrical support 152 which at its front end abuts the rear end of the objective means 60, this front end having an outwardly directed flange connected to the objective by way of a threaded ring 108 identical with that of FIGS. 4 and 7. At its rear end the support 152 has a bayonet structure which will coact with the bayonet structure 50 of the tubular projection 48 which projects forwardly from the front wall 46 of the camera housing 44 of FIG. 3.

The adapter means 150 is formed at its inner surface as a bearing to support for free rolling movement the antifriction bearing elements 154, and these elements coact with a freely turnable rotary ring 156 whose outer surface forms an inner bearing race to coact with the antifriction elements 154. The rotary ring 156 has a pair of projections 158 and 160 fixed thereto, extending parallel to the optical axis, and respectively projecting in opposite directions from the ring 156. The projection 158 coacts with the pin 88 to displace the latter into engagement with the stop pin 94 when the diaphragm is stopped down in the manner described above, and this projection 158 may in fact be composed of a pair of hingedly interconnected components interconnected by a spring element designed to permit breaking of the joint between the parts of the projection 158 when the front or forward part thereof places the pin 88 in engagement with the pin 94 so that the rear part can then continue to turn with the ring 156 in the event that the latter continues to be displaced by the action of element 52 shown in FIG. 3. Thus, this construction is the same as that of FIGS. 5 and 6 except that the pair of arms extend in the same direction when the forward arm engages a stationary pin carried by the rear arm and corresponding to the pin 124.

The rearwardly directed projection 160 is situated, when the diaphragm is wide open, beneath the element 52 so that when the latter moves downwardly just before the shutter opens the projection 160 will be displaced downwardly in the direction of the arrow 162 shown in FIG. 8, thus displacing the projection 158 in the direction of the arrow 164, and bringing about the desired stopping down of the diaphragm. The projection of diaphragm-actuating element 52 is wide enough to remain in engagement with the projection 160 throughout the entire range of diaphragm apertures capable of being provided with the objective means 60.

Of course, when the adapter means 150 is connected to the camera of FIG. 3 the projection 160 becomes situated beneath the diaphragm-actuating element 52.

FIGS. 9–11 schematically represent the objective means 60 by itself, at its rear end portion. Thus, it is apparent that within the outer housing of the objective the diaphragm assembly is included within an interior tubular housing 170 provided at its rear wall with an arcuate slot 172 through which the pin 88 extends so as to be engaged by the motion-transmitting structure of the adapter means. The configuration of the slot 172 is particularly apparent from FIG. 10, while FIG. 11 shows in dotted lines the position to which the pin 88 is capable of being displaced.

Figure 12:
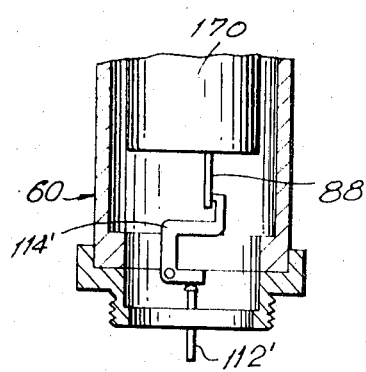
FIG. 12 is schematic sectional plan view showing how an adapter similar to that of FIG. 4 coacts with the diaphragm of the objective means of the invention.
Figure 13:
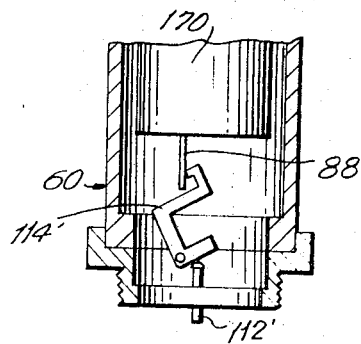
FIG. 13 shows the parts of FIG. 12 in a position different from FIG. 12.

In FIG. 12 there is schematically shown the pin 112' which corresponds to the pin 112 of FIG. 4 and which actuates a pivotally mounted lever 114' which corresponds to the lever 114, this lever 114' being pivotally carried by the adapter means in the manner described above. The adapter means is schematically represented in FIG. 12, and the lever 114' is shown in engagement with the pin 88. In FIG. 13 the parts of FIG. 12 are shown after the pin 112' has been advanced forwardly so as to displace the pin 88.

Figure 14:
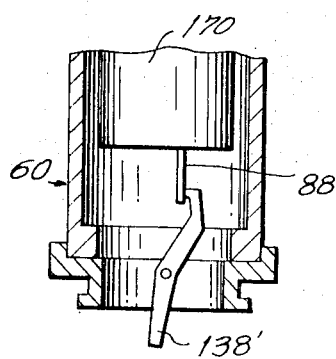
FIG. 14 is a fragmentary sectional plan view of a second adapter construction of the invention adapted to be used with the objective means of the invention and corresponding in general to the construction shown in FIG. 7.

In FIG. 14 there is shown a lever 138' corresponding to the lever 138 and also pivotally carried by the adapter means which is schematically shown in FIG. 14, this lever coacting with the pin 88 in the manner described above in connection with FIG. 7.

Figure 15:
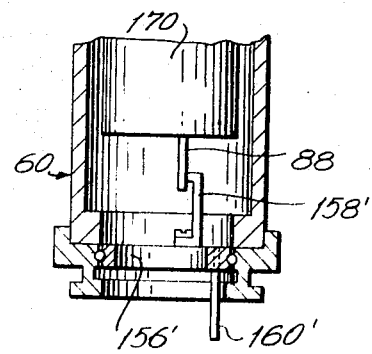
FIG. 15 is a fragmentary schematic sectional plan view showing another embodiment of an adapter means of the invention which in general corresponds to that of FIG. 8.

FIG. 15 shows schematically a rotary ring 156' corresponding to the ring 156 and carrying the pair of projections 158' and 160' which respectively correspond to the projections 158 and 160 of FIG. 8, the projection 158' being shown in engagement with the pin 88 so as to actuate the latter in the manner described above in connection with FIG. 8. The adapter means is also shown in FIG. 15 in a schematic manner.

Figure 16:
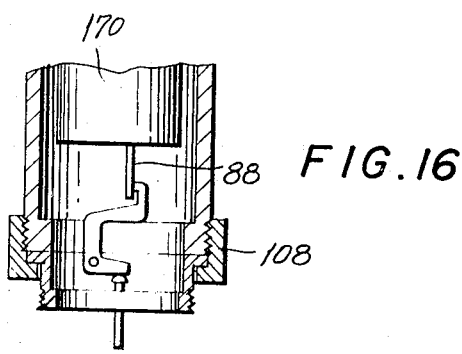
FIG. 16 shows, in a fragmentary schematic sectional plan view, a different adapter construction of the invention providing an operation similar to that of FIG. 12.

With the constructions shown in FIGS. 12-15 the adapter means may be in the form of a simple stepped cylindrical support having a front end surrounding and engaging the rear end of the objective means 60 in the manner illustrated in FIGS. 12-15, and any suitable screws of the like may be passed through openings of the cylindrical support to be received in threaded bores 174 indicated in FIG. 9. However, instead of this simple screw-type of connection of the adapter means to the rear end of the objective means, the arrangement shown in FIG. 16 may be provided where the threaded ring 108 is shown connecting the adapter means to the objective means in the manner described above in connection with FIG. 4. By way of example, FIG. 16 shows the adapter means of FIG. 12.

It is therefore apparent that with the structure of the invention it is only necessary to provide for each focal length a single construction for the objective means, and this objective means can be combined with any type of camera simply by being joined to a suitable adapter means which in turn will coact with the camera depending upon the type of diaphragm-actuating element thereof. As a result it becomes possible to greatly simplify the variety of objective constructions which are required to be made, and only a relatively limited number of different objective constructions are required so that there is a great reduction in the cost of these components while at the same time the different types of adapter means in and of themselves are quite inexpensive as well as being very reliable in operation.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. For use with single lens reflex cameras, objective means having a diaphragm, a camera housing having a diaphragm-actuating element, movement of which is governed by a diaphragm-adjusting member included in the objective means and variously positioned in accordance with a preset diaphragm value, and adapter means operatively connected on the front end thereof to said objective means for actuating said diaphragm according to said preset diaphragm value and on the rear end thereof to said camera housing to be actuated by said diaphragm actuating element thereof for transmitting movement from said diaphragm actuating element to said diaphragm of said objective means, whereby irrespective of the type of diaphragm actuating element the same objective means can be connected to said housing through said adapter means for actuating said diaphragm of said objective means with said diaphragm actuating element.

2. The combination of claim 1 and wherein said adapter means includes a cylindrical support adapted to be connected at one end to said objective means and at its opposite end to said camera housing, said housing including a diaphragm actuating element which moves perpendicularly with respect to the optical axis, and said adapter means including an elongated lever pivotally supported intermediate its ends by said support, having one arm coacting with said diaphragm of said objective means for actuating said diaphragm and having a second arm in the path of movement of said diaphragm-actuating element for being moved thereby to transmit movement thereof to said diaphragm.

3. The combination of claim 2 and wherein said lever is supported by said support means for turning movement about an axis which is perpendicular to the optical axis.

4. The combination of claim 3 and wherein said lever is situated beneath said optical axis and said diaphragm-actuating element is also situated beneath and moves horizontally with respect to said optical axis.

5. The combination of claim 1 and wherein said adapter means includes a cylindrical support adapted to be connected at one end to said objective means and at its opposite end to said camera housing, said adapter means including an interior rotary ring supported for rotary movement about the optical axis by said support, and a pair of projections extending parallel to the optical axis and respectively fixed to and projecting in opposite directions from said rotary ring, one of said projections coacting with said diaphragm of said objective means for actuating said diaphragm during turning of said rotary ring and the other of said projections being situated in the path of movement of said diaphragm-actuating element to be moved thereby for turning said ring and transmitting movement through said one projection to said diaphragm.

6. The combination of claim 5 and wherein said diaphragm-actuating element is situated beside the optical axis and is adapted to move vertically in the direction perpendicular thereto while engaging said other projection to turn said ring.

* * * * *